(No Model.)

D. F. TAYLOR.
SPOOL HOLDER.

No. 569,307. Patented Oct. 13, 1896.

Witnesses
A. E. Heen
G. E. Martin

Inventor
David F. Taylor
by N. B. Hagin. Atty.

UNITED STATES PATENT OFFICE.

DAVID F. TAYLOR, OF WICHITA, KANSAS.

SPOOL-HOLDER.

SPECIFICATION forming part of Letters Patent No. 569,307, dated October 13, 1896.

Application filed April 14, 1896. Serial No. 587,506. (No model.)

*To all whom it may concern:*

Be it known that I, DAVID F. TAYLOR, a citizen of the United States of America, residing at Wichita, in the county of Sedgwick and State of Kansas, have invented certain new and useful Improvements in Spool-Holders, of which the following is a specification, reference being had therein to the accompanying drawings, and the figures of reference thereon, forming a part of this specification, in which—

Figure 1:
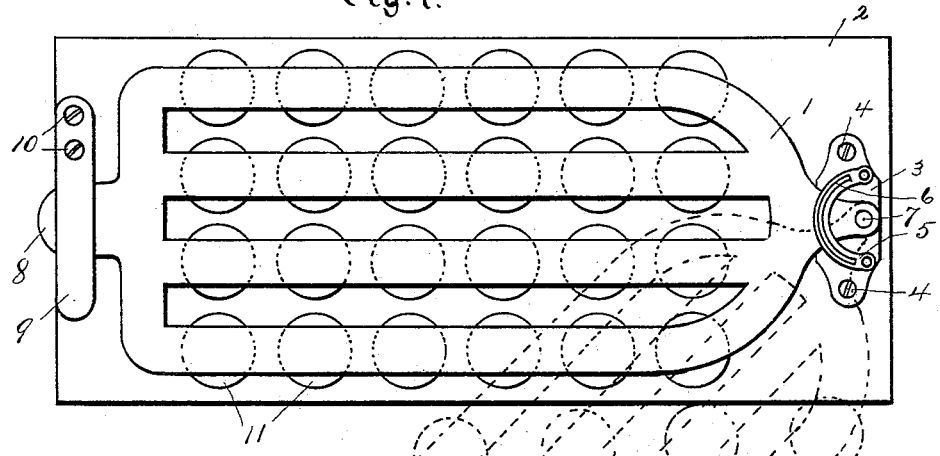
Figure 2:
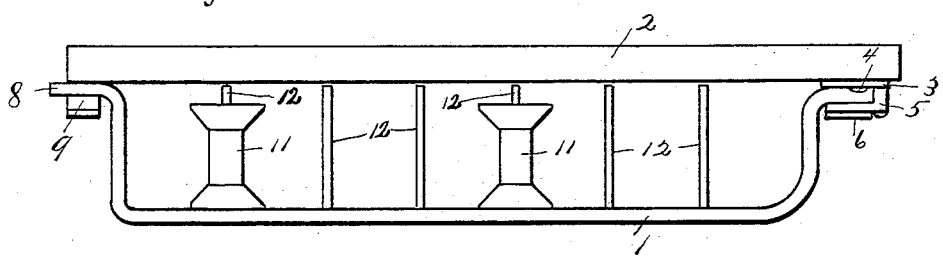

Figure 1 is a bottom plan of my improved spool-holder, showing the means of holding the same in place, also showing how said holder can be swung around to one side. Fig. 2 is an edge view of the same.

This invention relates to certain improvements in thread or spool holders; and it consists of a frame having a series of pegs for holding each spool separate from the other, said frame being adapted to be secured to a sewing-machine, to the bottom of the drawers, or to a suitable bracket; and the object of this thread or spool holder is to provide a convenient way for holding several spools of thread so they can be easily gotten at when desired and to prevent the thread from getting tangled, as is the case when it is thrown loose in a basket.

Referring to the drawings, 1 represents the frame, which is secured to a suitable support 2 through the medium of the plate 3. Said plate 3 is secured to said support 2 by the screws 4.

5 represents a track for supporting said frame while swung around, as shown by the dotted lines in Fig. 1. Said track is provided with the strengthening-rib 6. Said frame 1 is journaled at 7 to the plate 3.

8 represents a lip or handle and is secured to or made a part of said frame 1.

9 represents a spring-keeper secured to the support 2 by the screws 10. Said spring-keeper is for the purpose of holding the free swinging end of said frame in place.

11 represents a spool. 12 represents a series of pegs secured to or made in connection with said frame 1 and is for holding each individual spool 11.

When it is desired to remove a spool from the frame, the handle 8 is swung around, as shown by the dotted lines in Fig. 1, when the desired spool can be readily secured, as each spool is separate from the others and as the number on the spool is in sight. After lifting the desired spool from its holder the free end 8 of said frame can be swung back in the spring-keeper 9.

The track 5 is for the purpose of supporting said frame 1 while it is swung around ready to remove a spool.

Having thus described my invention, what I claim as new and useful, and desire to secure by Letters Patent, is as follows:

The herein-described spool-holder consisting of the combination of a base-support 2, the spring-keeper 9 secured at one end to said support, the plate 3 secured to the opposite end of said support, the circular track 5 secured to said plate 3, the frame 1 journaled to said plate at 7 between said plate and said track 5 said track adapted to support said frame 1 when swung around to remove thread, said frame being provided with the pins 12 for holding the spools and the lip 8 for engaging the spring 9.

DAVID F. TAYLOR.

Witnesses:
G. E. MARTIN,
A. E. HELM.